W. J. TURNBULL, DEC'D.
E. D. TURNBULL & J. T. SULLIVAN, EXECUTORS.
ENDLESS CARRIER.
APPLICATION FILED NOV. 12, 1913.
1,140,923.
Patented May 25, 1915.
2 SHEETS—SHEET 1.
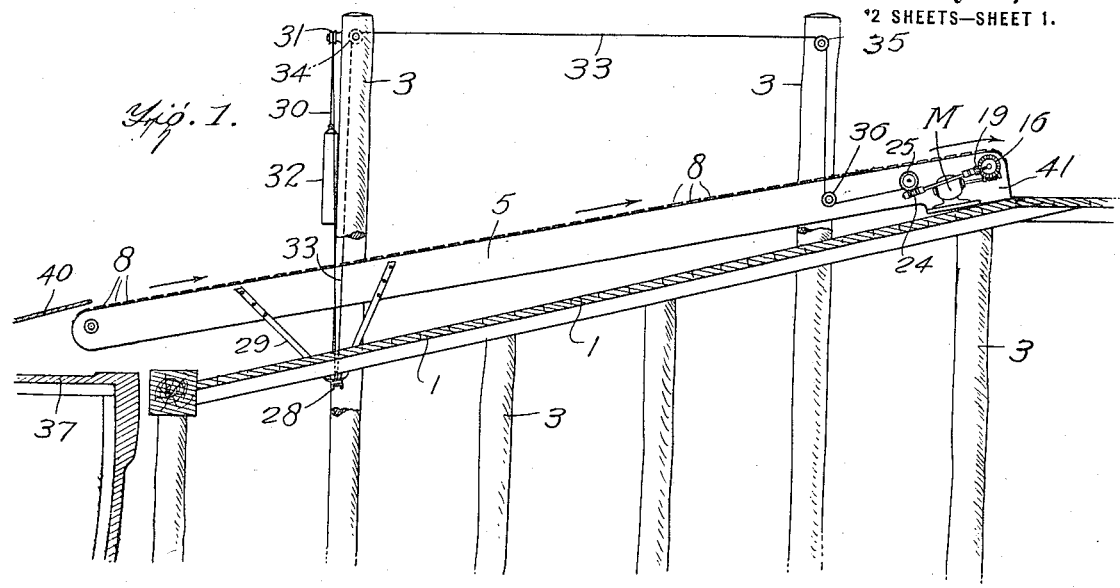
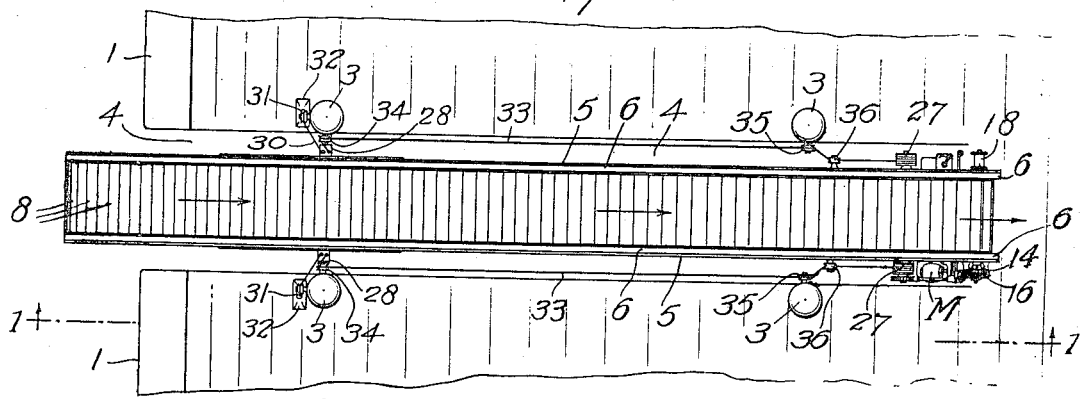
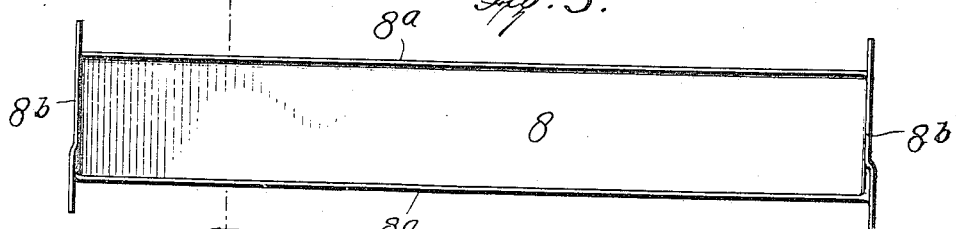
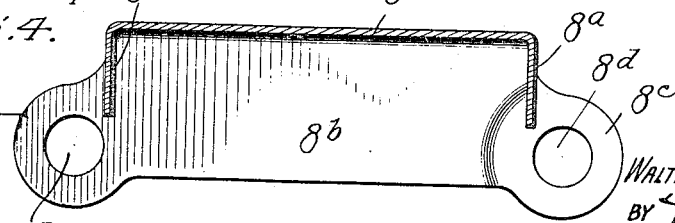
WITNESSES
L. H. Schmidt.
L. A. Stanley
INVENTOR
WALTER J. TURNBULL,
BY Munn & Co.
ATTORNEYS

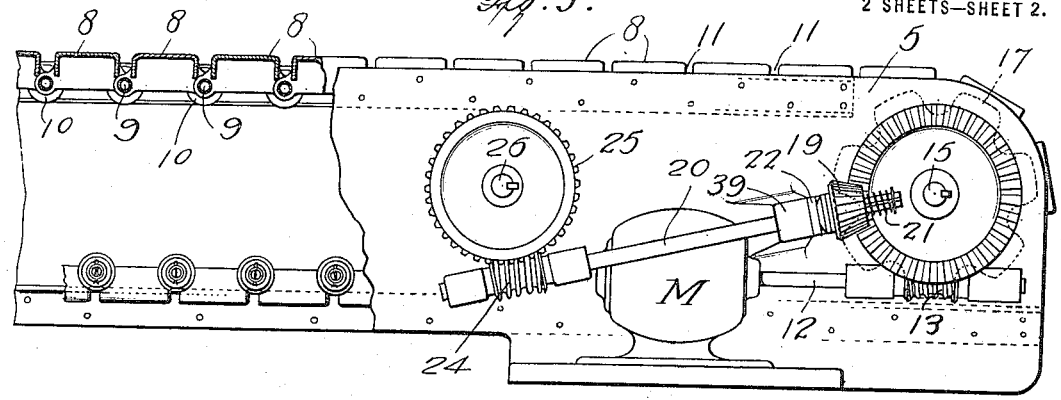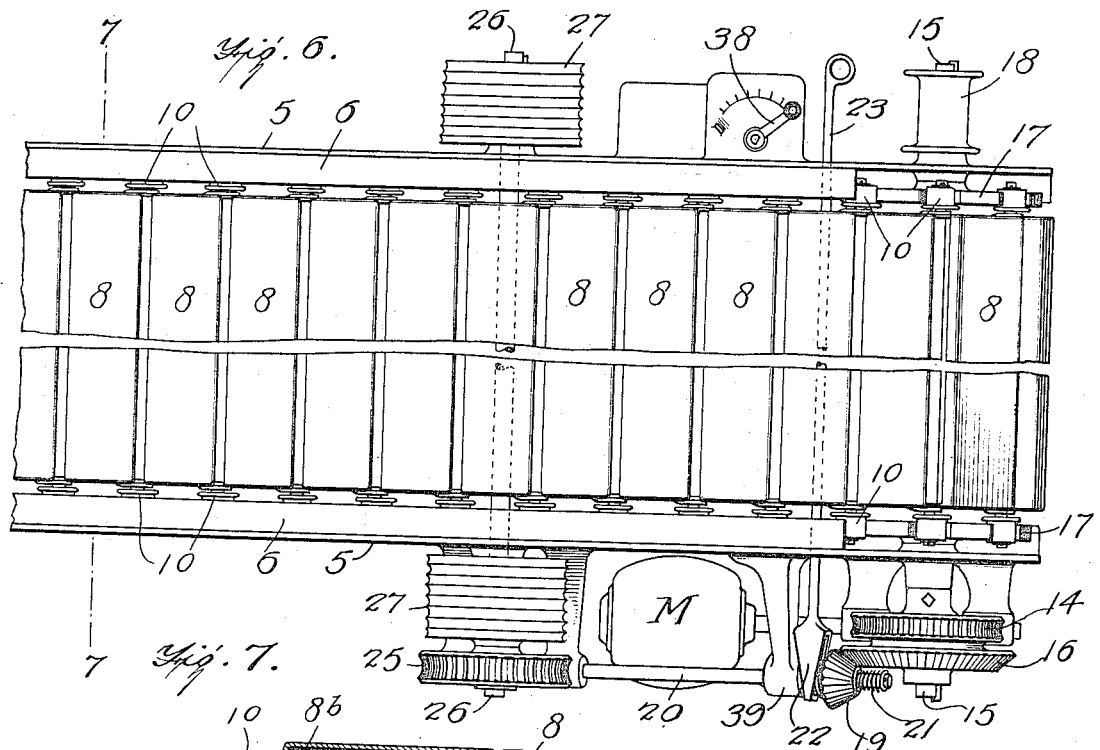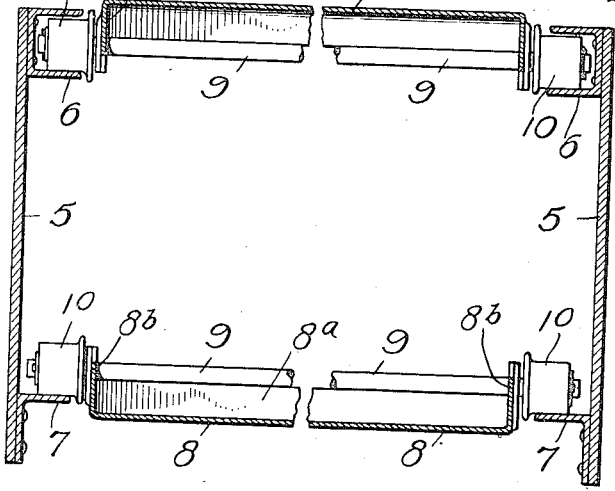

UNITED STATES PATENT OFFICE.

WALTER J. TURNBULL, OF NEW ORLEANS, LOUISIANA; EMILY DELANEY TURNBULL AND JOSEPH T. SULLIVAN, EXECUTORS OF SAID WALTER J. TURNBULL, DECEASED, ASSIGNORS OF ONE-HALF TO LEON LAVEDAN, OF NEW ORLEANS, LOUISIANA.

ENDLESS CARRIER.

1,140,923.          Specification of Letters Patent.        Patented May 25, 1915.

Application filed November 12, 1913. Serial No. 800,491.

*To all whom it may concern:*

Be it known that I, WALTER J. TURNBULL, a citizen of the United States, and a resident of New Orleans, in the parish of Orleans and State of Louisiana, have made certain new and useful Improvements in Endless Carriers, of which the following is a specification.

My invention relates to improvements in devices for conveying merchandise, as in the operation of unloading vessels, and it consists in the combinations, constructions and arrangements herein described and claimed.

An object of my invention is to provide an endless carrier made up of units of such shape that the carrier presents a practically continuous upper surface, while the units of which the carrier is formed readily pass around the ends of the frame upon which they are supported.

Other objects and advantages will appear in the following specification and the novel features of the device will be particularly pointed out in the appended claims.

My invention is illustrated in the accompanying drawings forming part of this application in which—

Figure 1 is a side view of the device in its operative position, the wharf being shown in section, Fig. 2 is a plan view of the device, Fig. 3 is a bottom view of one of the members which form the endless conveyer, Fig. 4 is a section along the line 4—4 of Fig. 3, Fig. 5 is an enlarged side view of a portion of the operating mechanism of the conveyer, Fig. 6 is an enlarged plan view of the upper portion of the conveyer mechanism, and Fig. 7 is an enlarged sectional view on the line 7—7 of Fig. 6.

In carrying out my invention I make use of any suitable wharf, such as that shown at 1 in Figs. 1 and 2. The wharf is supported upon the usual piles 3, certain of these piles being extended to form supporting posts. As will be seen from Fig. 2 the wharf has an inwardly extending cut-away portion 4 between opposed posts 3 and the conveyer is designed to be suspended in this cut-away portion in the manner hereinafter described.

The conveyer proper consists of a pair of side members such as those shown at 5 in Fig. 7. It will be seen from this figure that these side members bear at their upper parts U-shaped angle irons 6, which form runways for the movable parts of the conveyer. Lower L-shaped angle irons 7 are secured to the side members 5, and form supports for the return portion of the endless conveyer.

The endless conveyer is made up of a series of units. These are best shown in Figs. 3 and 4. It will be seen from these figures that each unit consists of a plate 8 having a flat surface with laterally extending flanges $8^a$ at the sides. At the ends of the plate 8 are integral end members $8^b$ having lugs or ears $8^c$, provided with openings $8^d$. The openings in the opposed end members $8^b$ are in alinement, and a shaft 9 is passed through the alined openings and bears on its outer ends wheels or rollers 10, like those shown in Figs. 5 and 7. As will be seen from Fig. 5 the extension or ear $8^c$ of one unit overlaps the extension of the adjacent unit and the rod 9 is common to both of these units at this point. This provides in reality a series of long flat and relatively narrow links. On the upper side of the conveyer the links form a practically continuous platform, the short space 11 between the links being practically negligible as far as making a continuous surface is concerned.

In Figs. 5 and 6 I have shown the means by which the conveyer is operated. This comprises a motor M whose shaft 12 bears a worm 13. The latter meshes with a worm wheel 14 (see Fig. 6) on a shaft 15. The latter extends through the side members 5 and bears at one end a beveled gear 16, and also the sprockets 17. A drum 18 is also mounted on the shaft 15. The gear 16 is designed to be engaged by a beveled gear 19, which is slidably mounted on a shaft 20. It is held normally out of engagement with the gear 18 by means of a spring 21 (see Fig. 6) but may be brought into engagement with the gear by means of a wedge-shaped yoke 22, which straddles the shaft 20, and which has a handle or shank 23 extending to the opposite side of the machine. The shaft 20 bears a worm 24, which engages a worm wheel 25 on a shaft 26. The latter bears winding drums 27.

As will be seen from Figs. 1 and 2 a bar 28 is disposed underneath the conveyer near the lower end thereof. This bar is connected with the side members 5 by means of inclined braces 29. Cables 30 are secured to the bar 28, pass upwardly, and around pulleys 31, which are secured to the posts on opposite sides of the conveyer. Counterweights 32 are carried by the cables 30. Cables 33 are also secured to the cross member 28 and pass upwardly and over pulleys 34 on the front supporting post or piles 3, thence rearwardly over pulleys 35 on the rear piles or supporting posts, thence downwardly over pulleys 36 on the side members 5, and thence to the winding drums 27 on either side of the conveyer.

The conveyer structure as a whole which includes the endless carrier forms the subject of a divisional application, Serial No. 825,333, filed March 18, 1914.

From the foregoing description of the various parts of the device the operation thereof may be readily understood. When it is desired to unload a vessel such as that shown at 37 in Fig. 1, the operator sets the starting lever 38 (see Fig. 6) in a position to start the motor M. The revolution of the latter causes the turning of the gear 16. If now the handle 23 is pushed forwardly so as to bring the wedge-shaped yoke in between the gear 19 and the hanger 39 the gear will be forced into mesh with the gear 16. This will cause the revolution of the shaft 20 and the winding or unwinding of the cables 33 in accordance with the direction of rotation of the motor, that is to say, the outer end of the device can be either raised or lowered so as to accommodate it to the height of the vessel. As soon as the desired height is attained the handle 23 is withdrawn and the spring 21 will force the gear 19 out of mesh with the gear 16. The counterbalancing weights 32 will hold the conveyer at the desired height. The motor may now be speeded up to the required speed for operating the endless conveyer. It will be seen from Fig. 6 that the sprocket wheels are arranged to receive the rollers 10, so that when the shaft 15 is revolving the endless conveyer will be operated so as to cause a movement thereof in the direction shown by the arrows in Fig. 1. Any merchandise which is placed on the conveyer from the deck or unloading platform 40 (see Fig. 1) will be transported by means of the movement of the conveyer onto the dock or warehouse floor, where it may be received and removed by any suitable apparatus.

One advantage of a device of this kind is that it may be raised or lowered to accommodate the heights of the discharging decks of different vessels or in accordance with the ebb and flow of the tide in seaports. The device requires no cover and does not in any way obstruct the stage, planks, derricks, etc., on vessels, as there are no fixtures other than the supporting posts 3 above the wharf level. One operator at the controller has perfect control of the conveyer.

I claim:

1. In an endless conveyer, a series of units, each unit comprising an elongated plate having a flat top and downwardly projecting flanges at its sides, downwardly projecting end members, said end members having perforated extended ears, the perforations in the ears of one of said end members being in alinement with the respective perforations in the ears of the other end member, a shaft disposed in each of the alined perforations, and rollers or wheels carried at the outer ends of each of said shafts, the ears of adjacent units overlapping and the shaft of one unit being common to and passing through the ears of the adjacent unit.

2. In an endless conveyer, a series of units, each unit comprising an elongated plate having a flat top and downwardly bent integral flanges at its sides, downwardly bent integral end members, said end members having ears extending laterally beyond the side members, said ears being in the same plane as the end members and being provided with perforations, the perforations in the ears of one of said end members being in alinement with respect to the perforations in the ears of the other end member, a shaft disposed in each of the alined perforations, the ears of adjacent units overlapping and the shaft of one unit being common to and passing through the ears of the adjacent unit.

WALTER J. TURNBULL.

Witnesses:
L. A. STANLEY,
SOLON C. KEMON.